(12) United States Patent
Ackley

(10) Patent No.: US 7,027,478 B2
(45) Date of Patent: Apr. 11, 2006

(54) MICRONEEDLE ARRAY SYSTEMS

(75) Inventor: Donald E. Ackley, Cardiff, CA (US)

(73) Assignee: BioValve Technologies, Inc., Westborough, MA (US)

(*) Notice: Subject to any disclaimer, the term of this patent is extended or adjusted under 35 U.S.C. 154(b) by 170 days.

(21) Appl. No.: 10/027,115

(22) Filed: Dec. 20, 2001

(65) Prior Publication Data
US 2003/0095582 A1 May 22, 2003

Related U.S. Application Data

(60) Provisional application No. 60/257,757, filed on Dec. 21, 2000.

(51) Int. Cl.
H01S 3/08 (2006.01)

(52) U.S. Cl. .......................................... 372/108; 372/6

(58) Field of Classification Search .................. 385/89, 385/146, 137; 604/46, 22, 167; 716/8; 257/81; 372/108, 6
See application file for complete search history.

(56) References Cited

U.S. PATENT DOCUMENTS

| | | | |
|---|---|---|---|
| 2,893,392 A | 7/1959 | Wagner | 604/47 |
| 3,034,507 A | 5/1962 | McConnell et al. | 604/46 |
| 3,086,530 A | 4/1963 | Groom | 606/186 |
| 3,123,212 A | 3/1964 | Taylor et al. | 206/367 |
| 3,136,314 A | 6/1964 | Kravitz et al. | 604/46 |
| RE25,637 E | 9/1964 | Kravitz et al. | 126/31 |
| 3,221,739 A | 12/1965 | Rosenthal | 604/47 |
| 3,221,740 A | 12/1965 | Rosenthal | 604/47 |
| 3,556,080 A | 1/1971 | Hein | 600/556 |
| 3,596,660 A | 8/1971 | Melone | 604/47 |
| 3,675,766 A | 7/1972 | Rosenthal | 206/367 |
| 3,918,449 A | 11/1975 | Pistor | 604/47 |
| 3,964,482 A * | 6/1976 | Gerstel et al. | 604/890.1 |
| 4,109,655 A | 8/1978 | Chacornac | 604/47 |
| 4,156,659 A | 5/1979 | Barnhart | 376/323 |
| 4,222,392 A | 9/1980 | Brennan | 600/556 |
| 4,320,758 A | 3/1982 | Eckenhoff et al. | 604/892.1 |
| 4,664,651 A | 5/1987 | Weinshenker et al. | 604/115 |
| 4,671,288 A | 6/1987 | Gough | 600/347 |
| 4,703,761 A | 11/1987 | Rathbone et al. | 600/576 |
| 4,771,660 A | 9/1988 | Yacowitz | 81/9.22 |
| 4,798,582 A | 1/1989 | Sarath et al. | 604/47 |
| 4,812,002 A * | 3/1989 | Kato et al. | 385/33 |
| 4,921,475 A | 5/1990 | Sibalis | 604/20 |

(Continued)

FOREIGN PATENT DOCUMENTS

DE 195 25 607 A1 1/1997

(Continued)

OTHER PUBLICATIONS

"101 Uses for Tiny Tubules", *Science*. vol. 247, Part I, Mar. 23, 1990.

(Continued)

Primary Examiner—Minsun Oh Harvey
Assistant Examiner—Tuan N. Nguyen
(74) Attorney, Agent, or Firm—Fish & Neave IP Group; Ropes & Gray LLP

(57) ABSTRACT

The present invention relates to systems of microneedle arrays to align and form optical components. Active components such as lasers are combined with optical fibers. Microneedles are fabricated using techniques such as laser drilled Kapton, and combined with optical fiber, using bump bonding and UV curing adhesives to manufacture a variety of optical components.

22 Claims, 12 Drawing Sheets

U.S. PATENT DOCUMENTS

| | | | | |
|---|---|---|---|---|
| 4,969,468 | A | | 11/1990 | Byers et al. .............. 600/373 |
| 5,035,711 | A | | 7/1991 | Aoki et al. ................ 424/422 |
| 5,054,339 | A | | 10/1991 | Yacowitz ................... 81/9.22 |
| 5,093,879 | A | * | 3/1992 | Bregman et al. ............ 385/93 |
| 5,138,220 | A | | 8/1992 | Kirkpatrick ................ 313/309 |
| 5,170,455 | A | * | 12/1992 | Goossen et al. ............ 385/89 |
| 5,250,023 | A | | 10/1993 | Lee et al. ................... 604/20 |
| 5,279,544 | A | | 1/1994 | Gross et al. ................ 604/20 |
| 5,279,552 | A | | 1/1994 | Magnet ...................... 604/47 |
| 5,335,670 | A | | 8/1994 | Fishman .................... 600/556 |
| 5,362,976 | A | * | 11/1994 | Suzuki ....................... 257/81 |
| 5,364,374 | A | | 11/1994 | Morrison et al. ........... 604/272 |
| 5,371,822 | A | * | 12/1994 | Horwitz et al. ............. 385/89 |
| 5,383,512 | A | | 1/1995 | Jarvis ........................ 164/46 |
| 5,401,242 | A | | 3/1995 | Yacowitz .................... 604/48 |
| 5,457,041 | A | | 10/1995 | Ginaven et al. ............ 435/455 |
| 5,473,716 | A | * | 12/1995 | Lebby et al. ................ 385/54 |
| 5,475,215 | A | * | 12/1995 | Hsu ........................ 250/227.11 |
| 5,527,288 | A | | 6/1996 | Gross et al. ................ 604/140 |
| 5,582,184 | A | | 12/1996 | Erickson et al. ........... 600/576 |
| 5,591,139 | A | * | 1/1997 | Lin et al. ................... 604/264 |
| 5,605,662 | A | | 2/1997 | Heller et al. ............... 422/68.1 |
| 5,611,806 | A | | 3/1997 | Jang .......................... 606/167 |
| 5,611,942 | A | | 3/1997 | Mitsui et al. ................ 216/67 |
| 5,618,295 | A | | 4/1997 | Min ........................... 606/171 |
| 5,631,988 | A | * | 5/1997 | Swirhun et al. ............. 385/89 |
| 5,632,957 | A | | 5/1997 | Heller et al. ............... 422/68.1 |
| 5,658,515 | A | | 8/1997 | Lee et al. ................... 264/219 |
| 5,697,901 | A | | 12/1997 | Eriksson ..................... 664/46 |
| 5,801,057 | A | | 9/1998 | Smart et al. ................ 436/68 |
| 5,807,375 | A | | 9/1998 | Gross et al. ............ 604/890.1 |
| 5,843,114 | A | | 12/1998 | Jang .......................... 606/186 |
| 5,848,991 | A | | 12/1998 | Gross et al. ................ 604/140 |
| 5,852,495 | A | | 12/1998 | Parce ......................... 356/344 |
| 5,858,188 | A | | 1/1999 | Soane et al. ................ 204/454 |
| 5,865,786 | A | | 2/1999 | Sibalis et al. ................ 604/20 |
| 5,876,675 | A | | 3/1999 | Kennedy ..................... 422/99 |
| 5,879,326 | A | | 3/1999 | Godshall et al. ........... 604/506 |
| 5,883,211 | A | | 3/1999 | Sassi et al. .............. 526/367.2 |
| 6,050,988 | A | | 4/2000 | Zuck ...................... 604/890.1 |
| 6,080,116 | A | | 6/2000 | Erickson et al. ........... 600/573 |
| 6,132,755 | A | * | 10/2000 | Eicher et al. ............... 424/427 |
| 6,340,251 | B1 | * | 1/2002 | Shibuya et al. ............. 385/89 |
| 6,447,174 | B1 | * | 9/2002 | Trezza ........................ 385/89 |
| 6,527,457 | B1 | * | 3/2003 | Chan et al. ................. 385/89 |
| 6,553,174 | B1 | * | 4/2003 | Winer ........................ 385/137 |
| 6,567,963 | B1 | * | 5/2003 | Trezza .......................... 716/8 |
| 6,611,707 | B1 | * | 8/2003 | Prausnitz et al. ............ 604/21 |

FOREIGN PATENT DOCUMENTS

| | | |
|---|---|---|
| DE | 299 11 250 U1 | 11/1999 |
| EP | 0 560 627 A2 | 9/1993 |
| EP | 0 497 620 B1 | 7/1998 |
| EP | 0 652 600 B1 | 4/1999 |
| JP | 7-132119 | 5/1995 |
| JP | 7-196314 | 8/1995 |
| WO | WO 93/17754 | 9/1993 |
| WO | WO 96/37256 | 11/1996 |
| WO | WO 96/40365 | 12/1996 |
| WO | WO 96/41236 | 12/1996 |
| WO | WO 97/07734 | 3/1997 |
| WO | WO 98/00193 | 1/1998 |
| WO | WO 98/00194 | 1/1998 |
| WO | WO 98/28037 | 7/1998 |
| WO | WO 99/64580 | 12/1999 |

OTHER PUBLICATIONS

"Single-crystal whiskers," *Biophotonics International* p. 64 (Nov./Dec. 1996).

Amsden et al, "Transdermal Delivery of Peptide and Protein Drugs: an Overview," *ALChE Journal* 41(8):1972-1997 (1995).

Bronaugh et al, *Percutaneous Absorption: Mechanisms, Methodology, Drug Delivery*, (1985).

Brumlik et al. "Template Synthesis of Metal Microtubules" *J. Am. Chem. Soc.* 199, 113, 3174-3175.

Despont, et al. "High-Aspect-Ratio, Ultrathick, Negative-Tone Near-UV Photoresist For MEMS Applications" *Proc. of IEEE 10th Annual International Workshop on MEMS*, Nagoya, Japan pp. 518-522 (Jan, 26-30, 1997).

Edell et al., "Factors Influencing the Biocompatibility of Insertable Silicon Microshafts in Cerebral Cortex" *Biomedical Engineering* vol. 39(6) Jun. 1992.

Frazier et al., "Metallic Microstructures Fabricated using Photosensitive Polyimide Electroplating Molds," *Journal of Microelectromechanical Systems* vol. 2(2):87-97, 1993.

Frazier et al., "Two Dimensional Metallic Microelectrode Arrays for Extracellular Stimulation and Recording of Neurons", *IEEE Proceedings of the Micro Electro Mechanical Systems Conference*, pp. 195-200 (1993).

Hadgraft & Guy, eds., *Transdermal Drug Delivery: Developmental Issues and Research Initiatives* (1989).

Haga et al., "Transdermal iontophoretic delivery of insulin using a photoetched microdevice," *Journal of Controlled Release* 43 (1997) 139-149.

Hashimi, et al., "Genetic Transformation of nematodes Using Arrays of Micromechanical Piercing Structures," *BioTechniques* 19(5):766-70 (1995).

Henry et al., "Microfabricated Microneedles: A Novel Approach to Transdermal Drug Delivery" *Journal of Pharmaceutical Sciences* vol. 87, No. 8 (1998).

Henry et al., "Micromachined Needles For the Transdermal Delivery of Drugs" IEEE Proceedings of *Micro Electro Mechanical Systems 11th Annual International Workshop* Heidelberg, Germany pp. 494-98 (Jan. 25-29, 1998).

Hoffert "Transcutaneous Methods Get Under the Skin," *The Scientist* 12 (1998).

Jaeger, *Volume V Introduction to Microelectronic Fabrication* (1988).

Jansen et al., "The Black Silicon Method IV: The Fabrication of Three Dimensional Structures in Silicon With High Aspect Ratios For Scanning Probe Microscopy and Other Applications," *IEEE Proceedings of Micro Electro Mechanical Systems Conference*, pp. 88-93 (1995).

Laermer et al., "Bosch deep Silicon Etching: Improving Uniformity and Etch Rate for Advanced MEMS Application" *IEEE International MEMS '99 Conference on Micro Electro Mechanical Systems* (Jan. 17-21, 1999).

Langer, "Drug Delivery and targeting" *Nature* vol. 392 Supp. Apr. 30, 1998 pp. 5-10.

Lehmann "Porous Silicon—A New Material For MEMS" *IEEE 9th Annual International Workshop on Micro Electro Mechanical Systems* (Feb. 11-15, 1996).

Lin, et al. "Silicon Processed Microneedles" *The 7th International Conference on Solid-State Sensors and Actuators*, 1993.

Martin et al., "Template Synthesis of Organic Microtubules," *J. Am. Chem. Soc.* 1990, 112, 8976-8977.

Najafi et al. "Strength Characterization of Silicon Microprobes in Neurophysiological Tissues," *IEEE Transactions on Biomedical Engineering* vol. 37, No. 5 May 1990.

Prausnitz, Mark. R. "Reversible Skin Permeabilization for Transdermal Delivery of Macromolecules" *Critical Reviews in Therapeutic Drug Carrier Systems,* 14(4):455-483 (1997).

Quan, "Researchers envision pain-free drug delivery: Plasma etch yields microneedle arrays" *Electronic Engineering Times* 63:63-64 (1998).

Rai-Choudhury, ed., *Handbook of Microlithography, Micromachining, and Microfabrication* Proceedings of the IEEE Micro Electro Mechanical Systems Conference 1987-1988.

Reiss "Glucose-and Blood Monitoring Systems Vie for Top Spot" *Biophotonics Int'l,* pp. 43-45 (May/Jun. 1997).

Runyan, et al. *Semiconductor Integrated Circuit Processing Technology* (1990).

Schift, "Fabrication of replicated high precision insert elements for micro-optical bench arrangements" *Proc. SPIE—International Soc. Optical Engineer* 3513:122-134 (1998).

Talbot et al. "Polymolding: Two Wafer Polysilicon Micromolding of Closed Flow Passages for Microneedles and Microfluidic Devices" *Solid State Sensor and Actuator Workshop* Hilton Head Island, South Carolina, Jun. 8-11 266-268 (1988).

Trimmer et al. "Injection of DNA into Plant and Animal Tissues with Micromechanical Piercing Structures" *IEEE Proceedings of Micro Electro Mechanical Systems Conference,* pp. 111-115 (1995).

Weber et al., "Micromolding—a powerful tool for the large scale production of precise microsctructure," *Proc. SPIE—International Soc. Optical Engineer* 2879:156-167 (1996).

Zuska, "Microtechnology Opens Doors to the Universe of Small Space" *Medical Device and Diagnostic Industry,* p. 131 (1997).

Duthie, P.J. et al. Passively aligned four-channel reflective InP MQW modulator transmitter. Electronics Letters 31(14), 1177-1179 (Jul. 6, 1995).

Wipiejewski, T. et al. Efficient Alignment Tolerant Coupling of Vertical-Cavity Lasers to Single-Mode Fibers. Proc. Euro. Conf. on Optical Comm. (ECOC), Zurich (Sep. 12-16, 1993).

* cited by examiner

FIBER IN NEEDLES

FIBER w/ EPOXY PLUG

FIBER w/ EPOXY LENS

FIBER w/ GRADED EPOXY LENS

MICRO-EXTRUSION

BEFORE INSERTION

AFTER INSERTION

FIBER w/ SENSOR PLUG

FIBER w/ LENS-SHAPED SENSOR ELEMENT

MICRONEEDLE ARRAY SYSTEMS

REFERENCE TO RELATED APPLICATION

This application claims under 35 U.S.C. 119(e) the benefit of the filing date of U.S. Provisional Application No. 60/257,757, filed on Dec. 21, 2000.

BACKGROUND OF THE INVENTION

Optical components such as those using vertical cavity surface emitting lasers (VCSELs) have been the subject of increasing investigation over the past decade throughout the world. VCSEL manufacturing has been initiated at several companies and commercial products incorporating VCSELs are available. The high performance of VCSELs such as high output power, high speed modulation provide for many commercial applications of VCSELs such as data links, smart pixels, print heads, display, scanning, sensors, etc. VCSEL arrays are successfully being integrated with optics and microelectronics. However, there is still a need to improve the performance of optoelectronic modules that connect VCSELs to the outside world, in particular, coupling VCSELs and other active components such as photodetectors to optical fibers. Optical components need to be manufactured economically and combine active components, such as lasers with optical fibers. Further, the manufacturing of integrated optical sensors needs to be improved.

SUMMARY OF THE INVENTION

The present invention includes systems of microneedle arrays to align multiple fibers to a laser or detector array. The present invention fabricates microneedles using techniques that include, for example, but are not limited to, laser drilled Kapton or epoxy molding, and combines them with optical fibers, bump bonding, and UV curing adhesives, to manufacture a variety of optical modules useful for communications and sensing.

The present invention provides economical optical components with precise optical alignment and high coupling efficiency. The components are scalable to a large number of lasers and/or detectors. In a particular embodiment the microneedle array is tapered.

The present invention includes the use of Vertical Cavity Surface Emitting Lasers (VCSELs) and planar photodetector arrays. The taper of the hollow needles allows fibers to be conveniently inserted into the wider end and then guided by the taper to a very precise position determined by the needle bore and the precision of the needle placement. Since the needles are fabricated using photolithography and/or laser drilling, both of which can achieve very accurate placement of the needles. Alignment to tolerances of approximately a micron can be achieved. The fibers are fixed in place using epoxy that is thermally or UV cured (or done in combination). The z-orientation is determined by fixturing the needles so that the fibers, when inserted, come in contact with a stop. Typical needle dimensions are about 125 µm exit hole, 125 µm length, 175–200 µm entrance hole and 250 µm centers.

The present invention can be utilized in applications such as, but not limited to, the gigabit ethernet, and other high speed optical interconnects requiring low-cost packaging, servers, optical backplanes, and intranets. Further, the present invention has applications in sensing systems.

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

The present invention relates to using microneedles, in particular, tapered microneedles, to align and form optical components. Active components, such as lasers, can be combined with optical fibers, either singly or in arrays with a large number of fibers.

Microneedle devices and manufacturing methods for the microneedles are described in the following patent applications, U.S. Ser. No. 09/095,221, filed on Jun. 10, 1998, now U.S. Pat. No. 6,503,231, U.S. Ser. No. 09/448,107, filed on Nov. 23, 1999, now U.S. Pat. No. 6,743,211, U.S. Ser. No. 09/452,979, filed on Dec. 2, 1999, now U.S. Pat. No. 6,611,707, and U.S. Ser. No. 09/453,109, filed on Dec. 2, 1999, all of which are herein incorporated by reference in their entirety.

Referring to FIGS. 1A, 1B, 2A and 2B, to align the needle array 10 to the laser array 12, bump bonding using solder bumps 14 is used. This technique utilizes the surface tension of molten solder to align the two substrates. It has been shown that large misalignments (depending on the bump size, a few mils of lateral misalignment) may be taken up upon melting of the solder. The bump height, and hence the distance from the fibers to the laser array, may also be accurately controlled by controlling the pad 16 size on the needle array and the size of the solder ball on its mating piece.

Figure 1A:
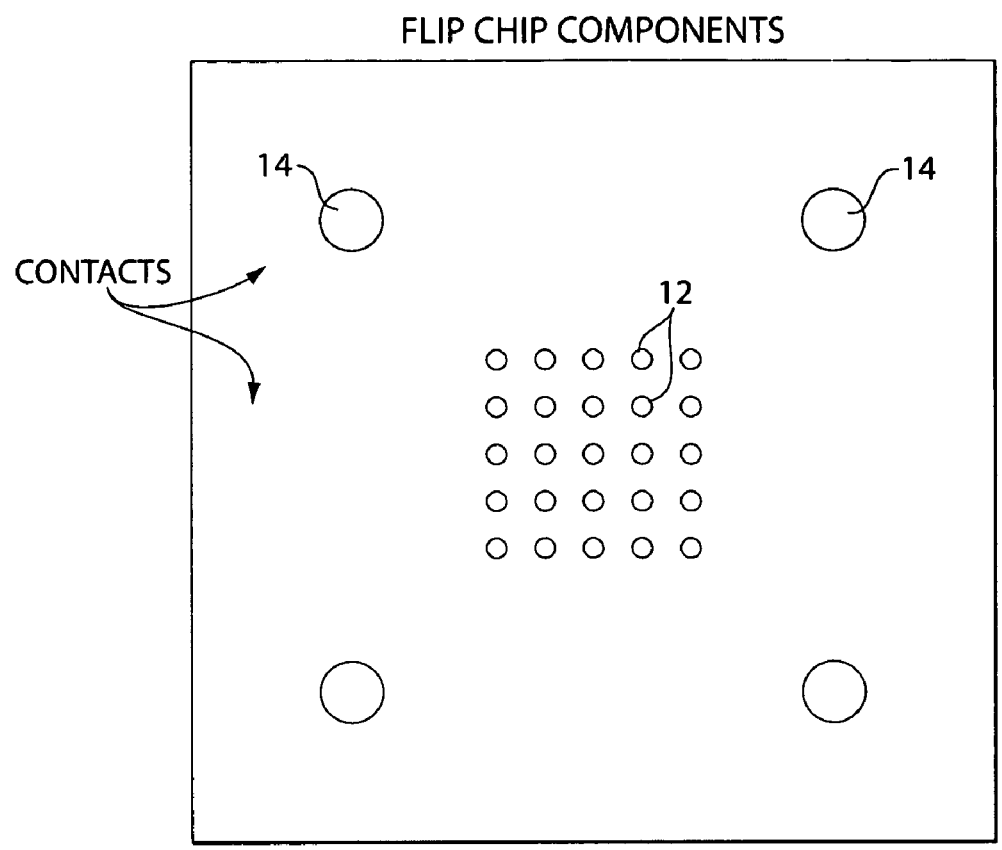
FIGS. 1A and 1B are schematic views of flip chip components.
Figure 1B:
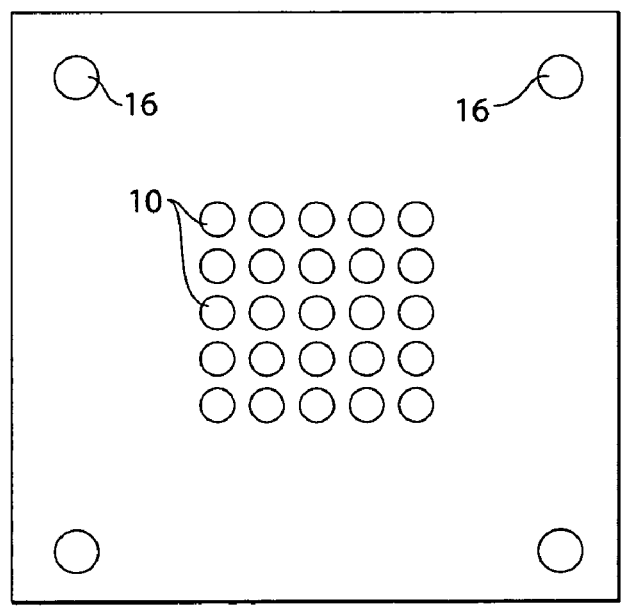
Figure 2A:
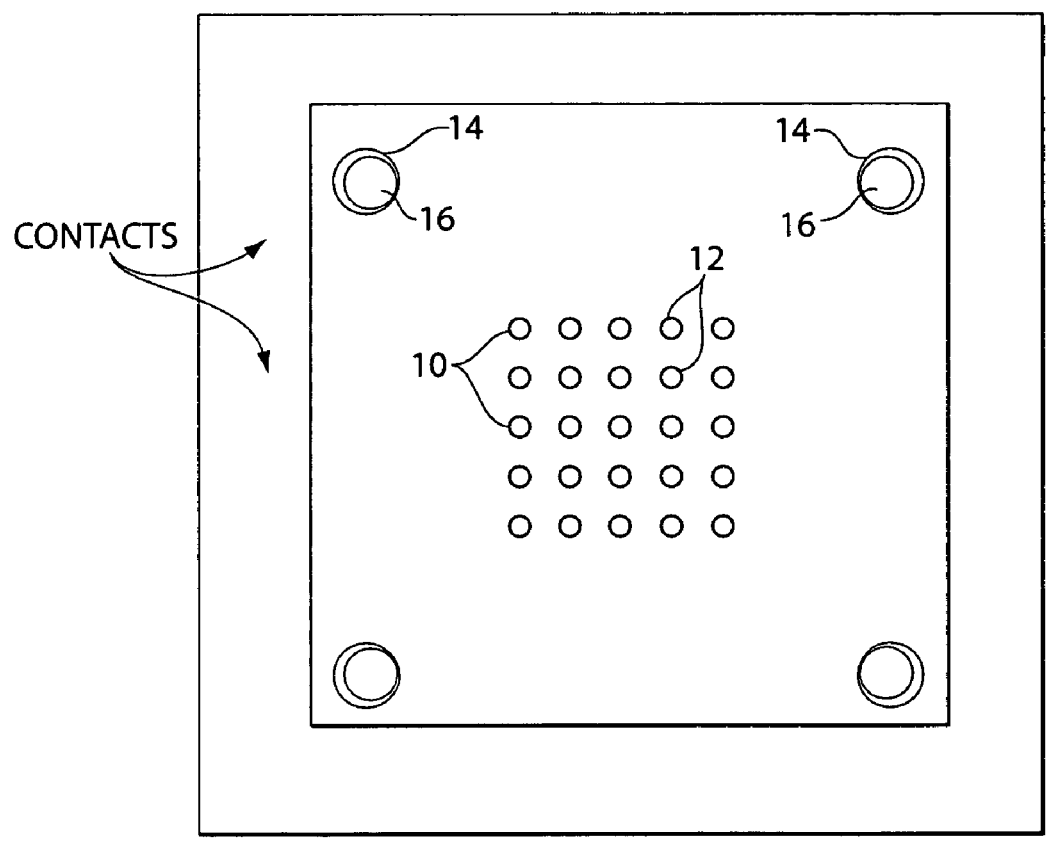
FIG. 2A is a top view of an assembly in accordance with the present invention.
Figure 2B:
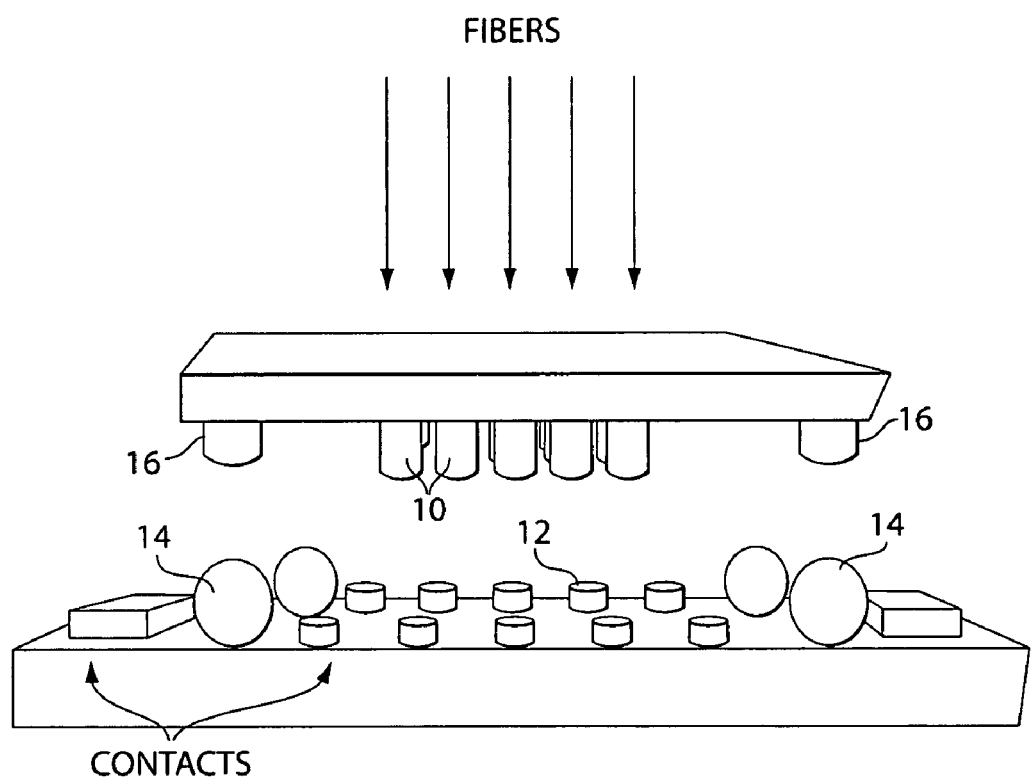
FIG. 2B is a detailed view of the flip chip assembly in accordance with the present invention.
Figure 3A:
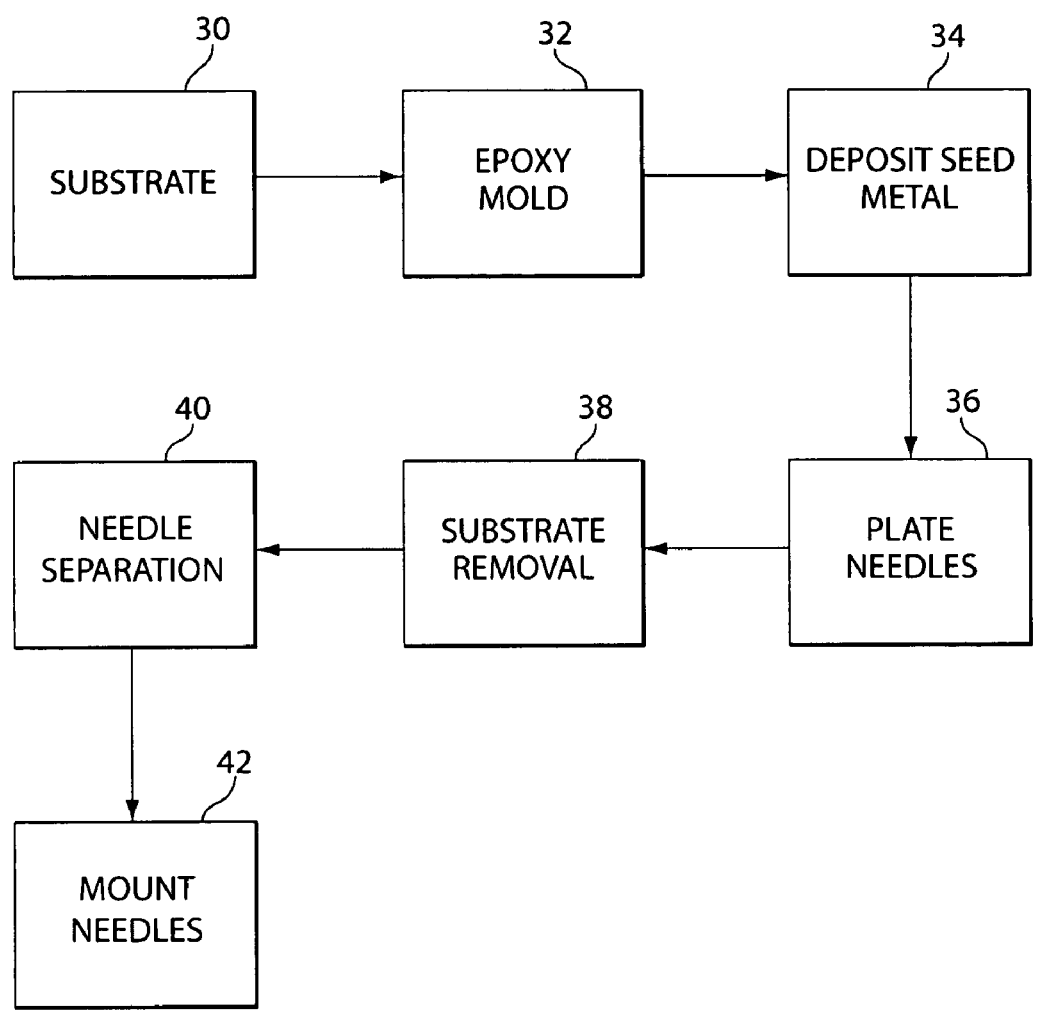
FIGS. 3A and 3B are flow charts of the microneedle fabrication process and fiber/VCSEL assembly process in accordance with the present invention.
Figure 3B:
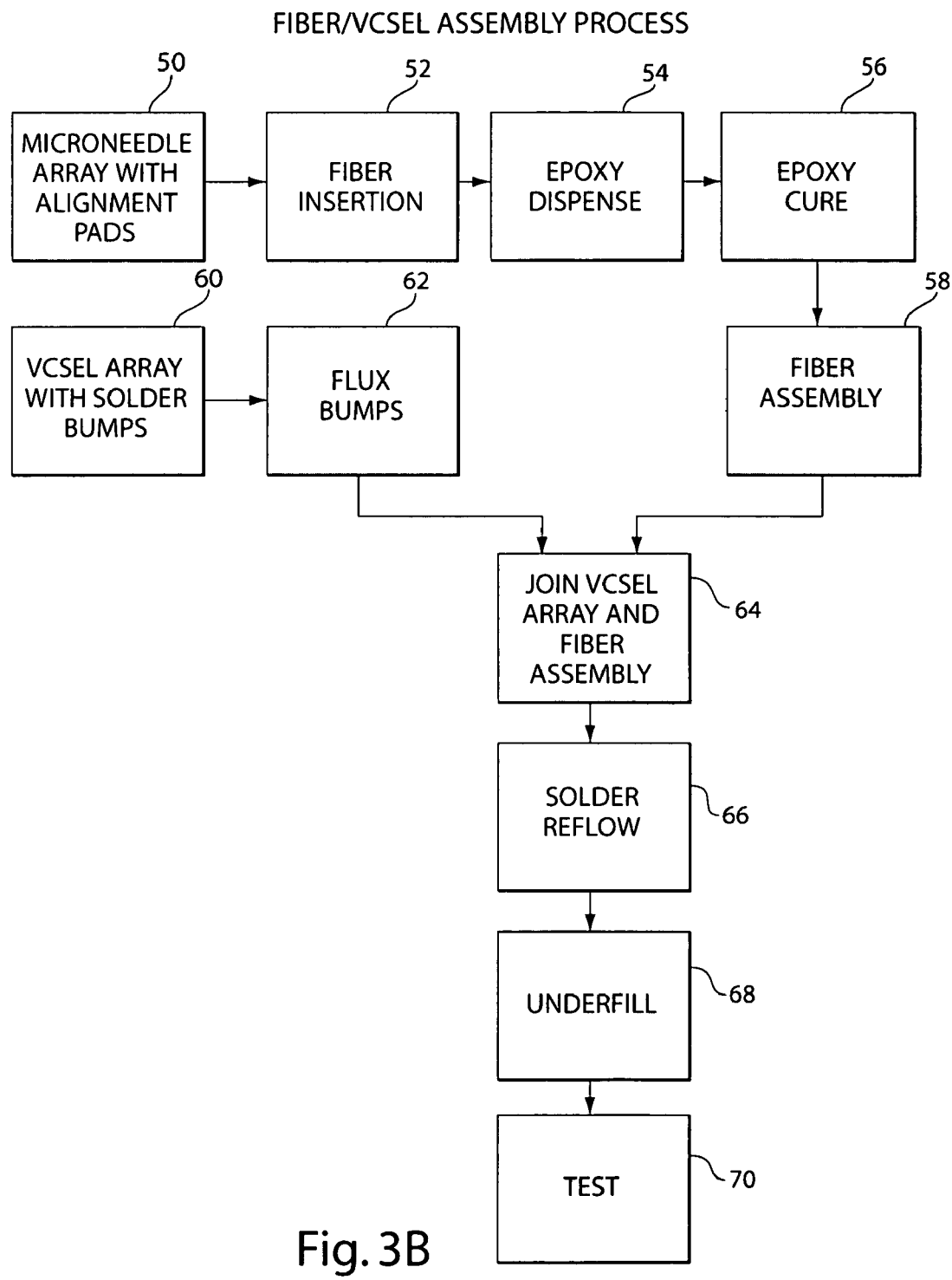

Referring to FIGS. 3A and 3B, a preferred embodiment of the present invention includes a method to manufacture the microneedles and then assemble the fiber and VCSEL arrays having the following steps. Per step 30, microneedle devices include a substrate to which the base of the microneedle(s) is secured or integrated. The substrate can be formed from a variety of materials including, but not limited to, metals, ceramics, semiconductors, organics, polymers and composites. The substrate is coated with a photolithographically patterned epoxy molded per step 32 and seed metal is then deposited thereon per step 34. The needles are then plated per step 36, such as, for example, by electroplating. The substrate is then removed per step 38, leaving the microneedle array. The needles are separated per step 40 and then mounted per step 42.

Referring specifically to FIG. 3B, the assembly process for the fiber and VCSEL arrays includes the step of taking the microneedle array with alignment pads per step 50 and inserting fibers into the microneedle array per step 52. Per step 54 and 56, epoxy is dispensed and cured to form the fiber assembly of step 58. To form the VCSEL array with solder bumps per step 60, solder balls are first placed, or plated, onto the diode laser wafer in such a manner that each VCSEL array on the wafer has associated with it a number of solder bumps arranged in a symmetric geometry. These solder bumps are reflowed to form a hemispherical shape. The wafer is then diced into individual laser array chips. Next, the bumps are coined as necessary to flatten them out. The fiber/needle assembly, put together as described above, is fixtured and held in place. A laser chip is then picked up using a manual tool or a pick and place machine, flipped over, the bumps coated with flux by a dipping process per step 62, and placed and coarsely aligned onto the fiber assembly. The VCSEL array and fiber assembly are then joined per step 64. This procedure is optimally performed using a flip-chip bonder. The fiber assembly is then heated to reflow the solder per step 66. The laser chip moves to align over the bumps and the assembly is cooled to harden the solder. Transparent underfill is then applied between the laser chip and the fiber/needle array per step 68, providing both mechanical strength as well as increasing the coupling efficiency. The assembly is then tested per step 70.

The method of the present invention results in several improvements. First, micrometer alignments are achieved for a large number of fibers and lasers in all three dimensions. Second, the fibers are easily inserted and attached to the needle array due to the taper. Additional strength may be provided with a perforated substrate. The needles offer improvement over simple holes because they protrude from the substrate and allow the solder bumps to be of the appropriate height. Since the needles may be economically fabricated with precise dimensions from, for example, metal, using circuit board techniques, they are inherently cheaper than silicon MEMS structures. Alternatively, they are molded from high-temperature plastics with similar advantages.

Figure 4A:
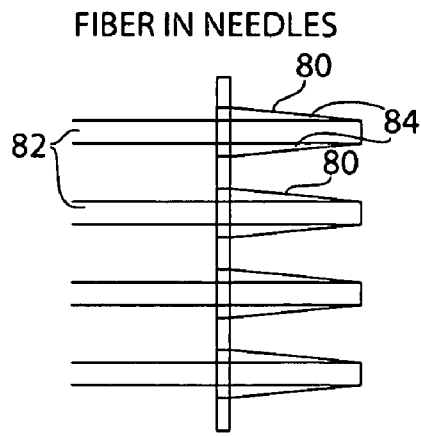
FIGS. 4A–4C are cross-sectional views of fiber assemblies in accordance with the present invention.
Figure 4B:
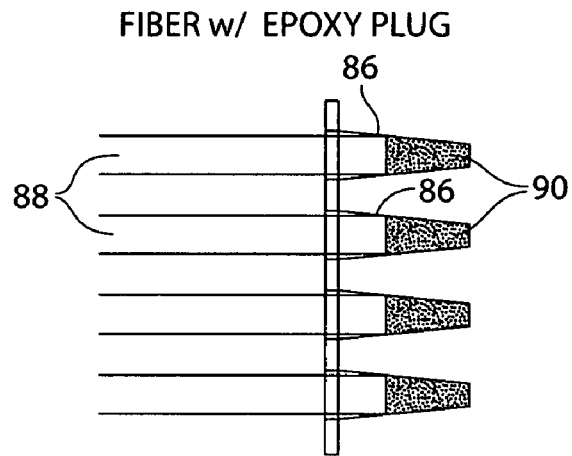

Referring to FIGS. 4A and 4B, in an alternative embodiment of the present invention, UV-curing epoxy is first injected into the needles 80, 86 to form a tapered waveguide. The needle array is fixtured into place in proximity to a UV light source with the narrow exit hole facing the source. A controlled amount of UV curing epoxy 84, 90 (Norland) is injected into a chamber above the needles and down the needle bores. As the epoxy exits the bore, the UV light source is switched on and the epoxy cures at the exit hole. Depending on how long the light source is left on, the epoxy cures further up the tube, but this is a slow process. Thus, the epoxy forms a plug or stop at the end of the tapered needle. The optical fibers 82, 88 are then inserted into the uncured epoxy in the tapers, and fixed into place using a second UV light source behind the needle array. The epoxy is then totally cured using further UV exposure or a thermal curing process. The cured epoxy plug at the end of the needle forms an intermediate waveguide to couple the light from the laser into the fiber. Since the laser dimensions are much smaller than the needle dimension (approximately 10 µm vs. 100 µm for the needle) the beam divergence is small and there is little chance for scattering into higher order optical modes in the epoxy plug, and the coupling even into single mode fiber is efficient.

Figure 4C:
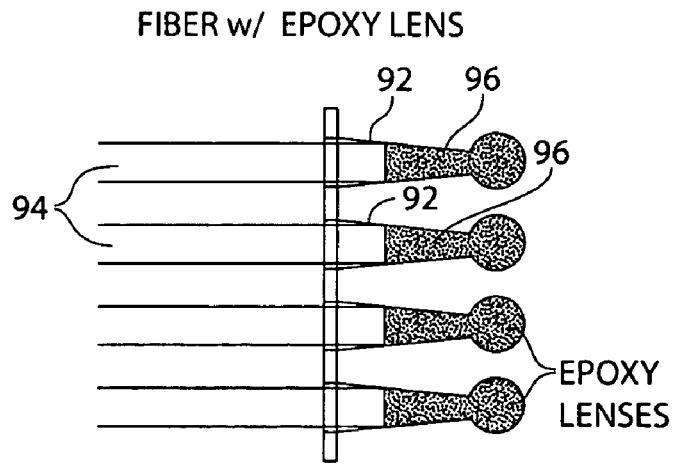

Referring to FIG. 4C, in another embodiment, the epoxy 96 is injected through the needle 92 and allowed to form a spherical drop at the end of the needle before the UV light source is turned on. The UV light source can then be turned on the cure the epoxy into a lens shape. The radius of the lens is determined by the viscosity of the epoxy, the flow rate, surface tension, and the amount of time the UV light source is delayed before it is turned on to expose the epoxy. The fibers 94 are then inserted and attached as described above. The lens on the end of the needles serves to increase the coupling efficiency and alignment tolerances. The lensed fiber array may then be aligned to the detector or laser array as described above.

In another embodiment, the lenses are formed on a first needle array with minimal UV exposure. A fiber assembly is built up separately using a second needle array as described previously. This fiber assembly is then inserted into the first lensed needle array and the epoxy cured to form a coupled lensed fiber array. The two tapers serve to provide the mechanical alignment while the lens increases the optical alignment tolerances and the coupling efficiency. In order to provide more precise alignment, the taper of the fibered needles may be chosen to have a larger angle than the lensed needle array. Thus, the fibered needle array encounters a mechanical stop upon insertion which provides both lateral and longitudinal alignment and stability.

Figure 5:
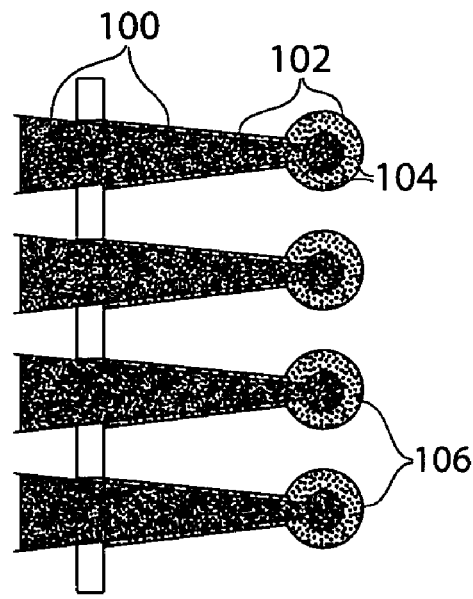
FIG. 5 is a cross-sectional view of fibers with graded epoxy lens in accordance with the present invention.

Referring to FIG. 5, by using two coaxial needles 100 (created by inserting one into the other as described above) coupled to separate liquid reservoirs, more sophisticated optical components may be fabricated on the needle ends. If each reservoir is connected to an epoxy 102, 104 of different refractive index, the materials can be simultaneously injected down the two coaxial needles to form a lens 106 with a graded refractive index. Spacers may be added during the taper fabrication process to stand the inner coaxial needle off from the outer needle and allow the free flow of epoxy between the two tapered needles. Lenses of this type may have some advantages for aberration correction, shorter focal distances, etc. To utilize the lens, after curing, the inner coaxial needle array is removed and a fiber/needle assembly inserted. Or, after removal of the inner coaxial needle array, the remaining epoxy may be cured to form the template for a removable connector.

Alternatively, by using the two coaxial needle approach, the tapers may be filled with an epoxy plug with a step or graded refractive index profile. This profile has the advantage of minimizing scattering into higher order modes in the expanding taper, or minimizing losses in the contracting taper because the interaction with the metal taper walls is less.

Figure 7A:
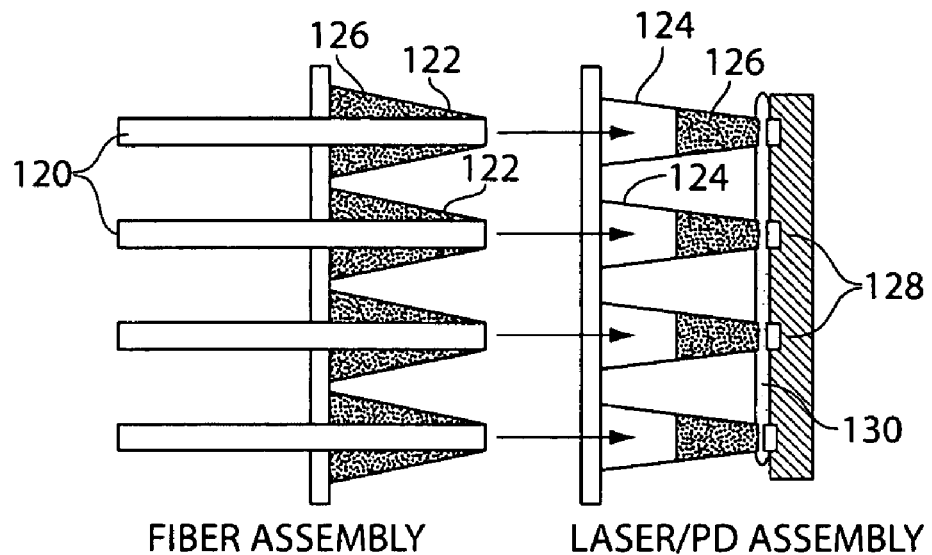
FIGS. 7A and 7B are views illustrating the coupling of the fiber connector to the laser array, before and after the coupling respectively, in accordance with the present invention.
Figure 7B:
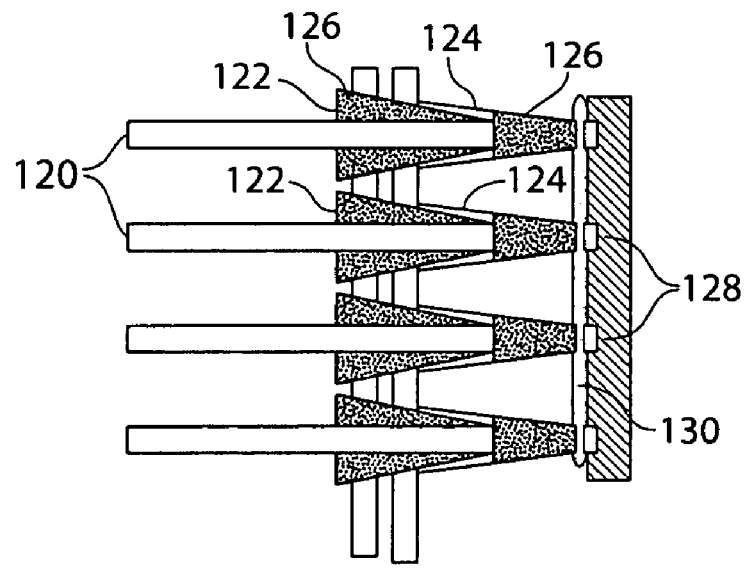

Referring to FIGS. 7A and 7B, in yet another embodiment, by using the two needle arrays 122, 124 described herein before it is possible to create a removable fiber connector for coupling to a laser array 128. A first needle array 124 is formed with either a lens or a plug at the end by the UV curing process described above. The excess epoxy is removed from the back of the array. A soft elastomer such as PDMS may be dispensed into the holes as necessary. Pins through holes in the needles arrays are then used for coarse alignment. Fine alignment is provided by the tapered shapes of the needles themselves. A second fibered needle array 122 may then be repeatably inserted or removed to couple the fiber array 120 to the light sources.

Figure 8:
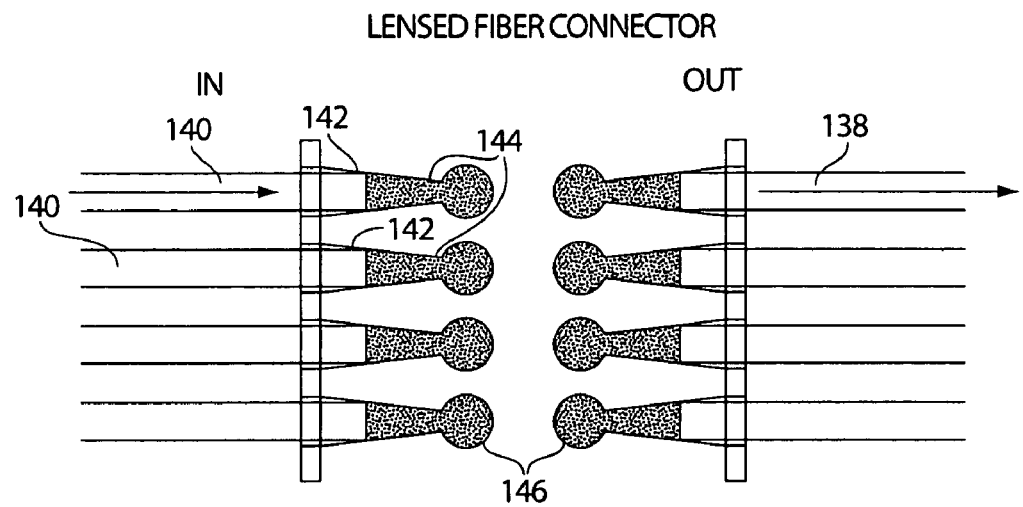
FIG. 8 is a cross-sectional view illustrating a lensed fiber connector in accordance with the present invention.
Figure 9:
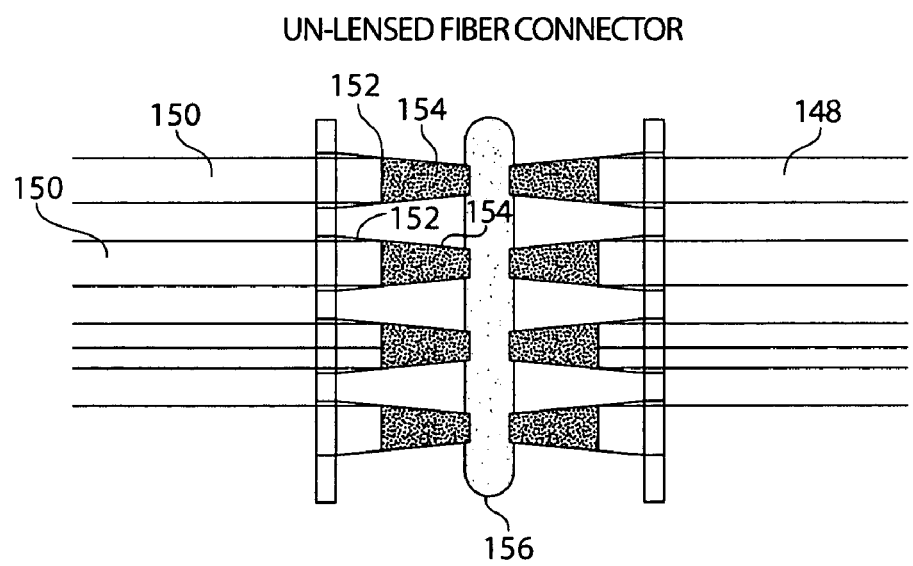
FIG. 9 is a cross-sectional view illustrating an un-lensed fiber connector in accordance with the present invention.

Referring to FIGS. 8 and 9, two fiber/needle arrays 138, 140, 148, 150 may be combined to form a connector by facing the two needle arrays towards each other to couple light from one to the other. The fiber arrays 138, 140, 148, 150 may have either fibers only, the UV cured epoxy plug 154, or the UV-shaped lens arrays 146 for improved coupling. Alignment may be provided by precision pins through the two fiber arrays as is commonly done today in fiber-optic ribbon connectors.

Figure 10:
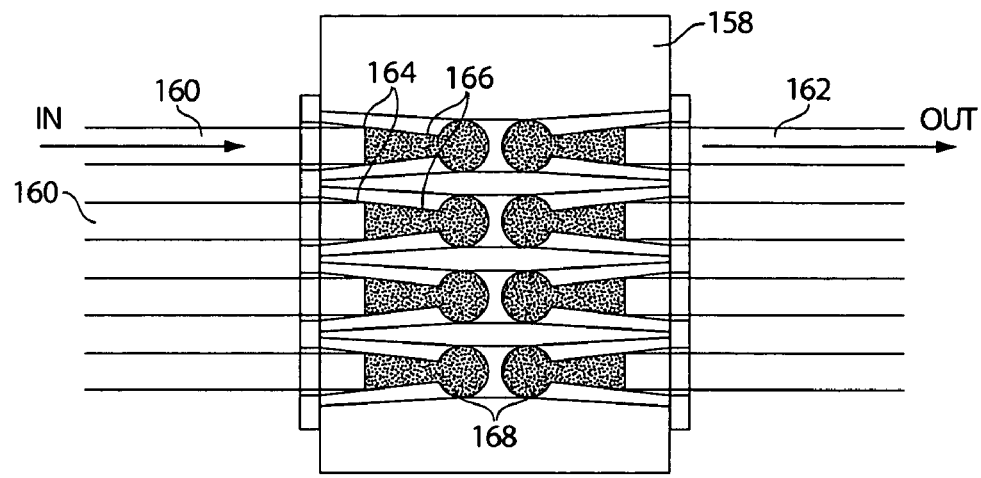
FIG. 10 is a cross-sectional view of a lensed fiber connector with an alignment spacer in accordance with the present invention.
Figure 11:
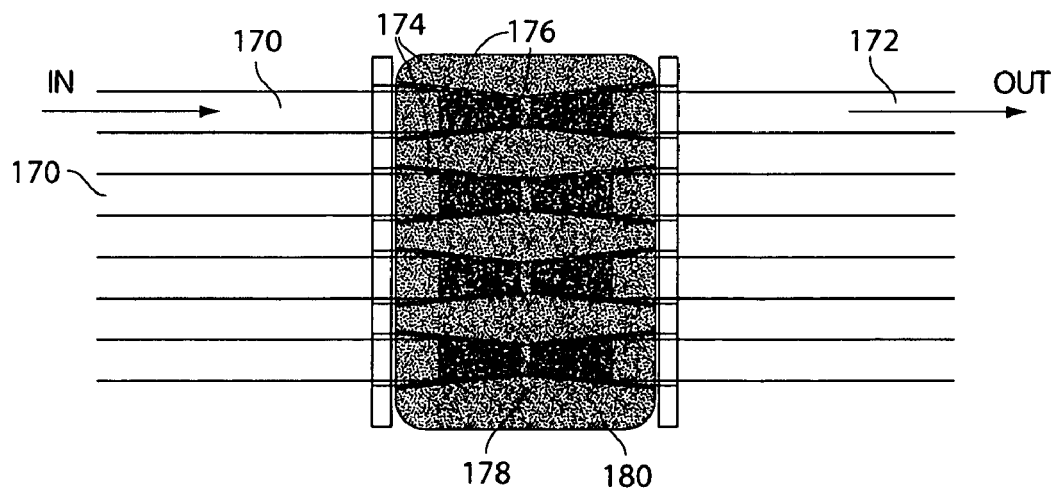
FIG. 11 is a cross-sectional view of an un-lensed fiber connector with an alignment spacer in accordance with the present invention.

Referring to FIGS. 10 and 11, a compliant, transparent spacer sheet 158 may be used between the needle arrays to provide improved optical coupling by reducing beam divergence. In that case, the needles 164, 174 form indentations in the compliant sheet and provide good coupling. Alternatively, a spacer sheet 180 is provided with laser drilled or lithographically patterned holes having a double taper of dimensions comparable to the needle dimensions. The sheet may be bonded onto one end of the fiber connecter with the tapers over the needle array. When the second fiber/needle assembly is inserted, fine alignment is achieved by the second taper in the spacer sheet. In one embodiment, the spacer sheet may be fabricated in Kapton like the needle molds. In that case, two Kapton layers separated by a metal layer are used. Standard, aligned tapers are formed on both sides of the proper dimensions, and then the metal layer drilled or etched through to couple the two holes. Alternatively, the spacer sheet is fabricated to accommodate one or two of the microlenses formed on the end of the needles. The lenses fit coaxially down the apertures in the spacer layer to provide high coupling efficiency. This embodiment has the advantage of controlling rotational variations quite effectively.

In the case of the lensed needle/fiber assemblies, the lens parameters are chosen to emit a nearly collimated beam for good optical tolerances. Larger lenses may be formed for better lateral tolerances.

In yet another embodiment, an emitter (for example, a laser or LED) array and a detector array are coupled to needles filled with epoxy, each having a flat back surface. The emitter/needle assembly is then placed back to back with the detector/needle array and cemented together to form a multichannel opto-isolator. Voltage isolation is determined by the dielectric strength of the epoxy. By using VCSELs a very high speed multi-channel opto-isolator is achieved quite cheaply for data transmission and control applications.

Figure 6:
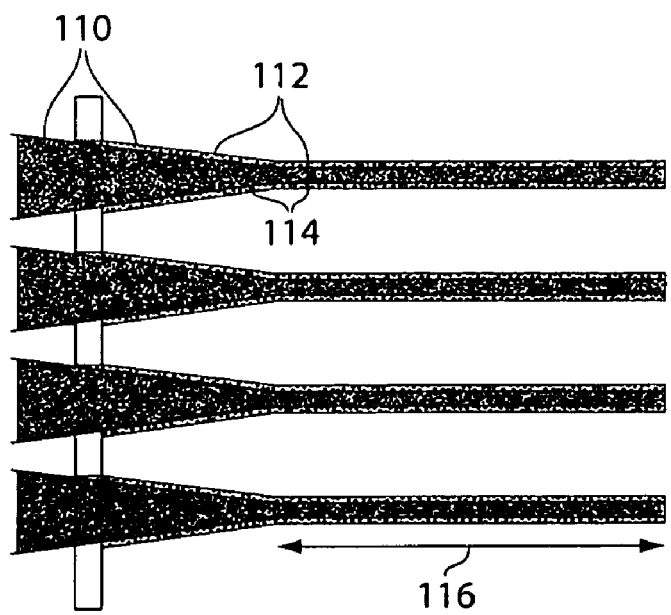
FIG. 6 is a cross-sectional view of an extruded optical waveguide in accordance with the present invention.

Referring to FIG. 6, plastic fiber is of interest for low cost visible optical waveguides. Using a tapered microneedle 110 in contact with a reservoir, plastic optical waveguide may be extruded in dimensions of the range 20–200 µm. In order to form a core/cladding structure coaxial needles as described above may be utilized. By putting the central needle in contact with a reservoir containing plastic 112 of refractive index n1, and the outer needle in contact with a reservoir with plastic 114 of refractive index n2 where n2<n1, a standard waveguide refractive index profile may be extruded under appropriate conditions of temperature and pressure. Fiber arrays can be readily extruded by using a one-dimension or 2-dimension needle array. By the appropriate choice of extrusion geometry and dimensions, a graded index profile is also achieved, primarily by compressing the outer plastic into the inner core as it passes through the needle.

Figure 12A:
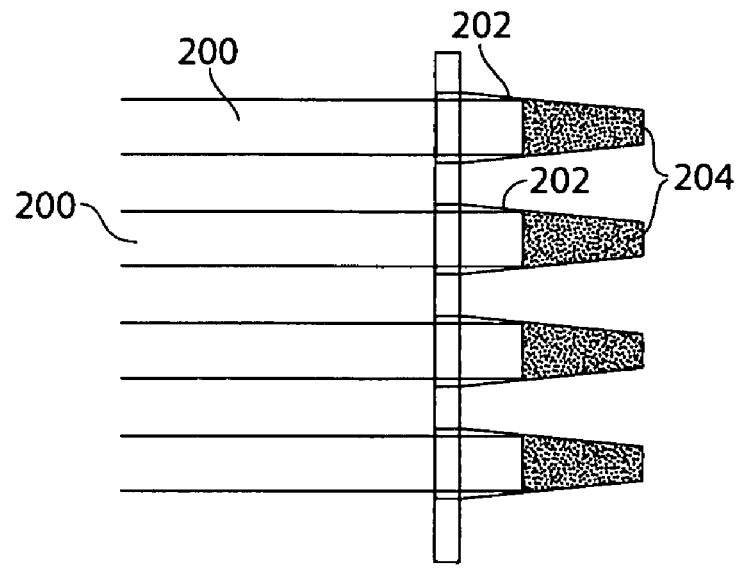
FIGS. 12A–12C are cross-sectional views of microneedle/fiber arrays with sensing elements in accordance with the present invention.
Figure 12B:
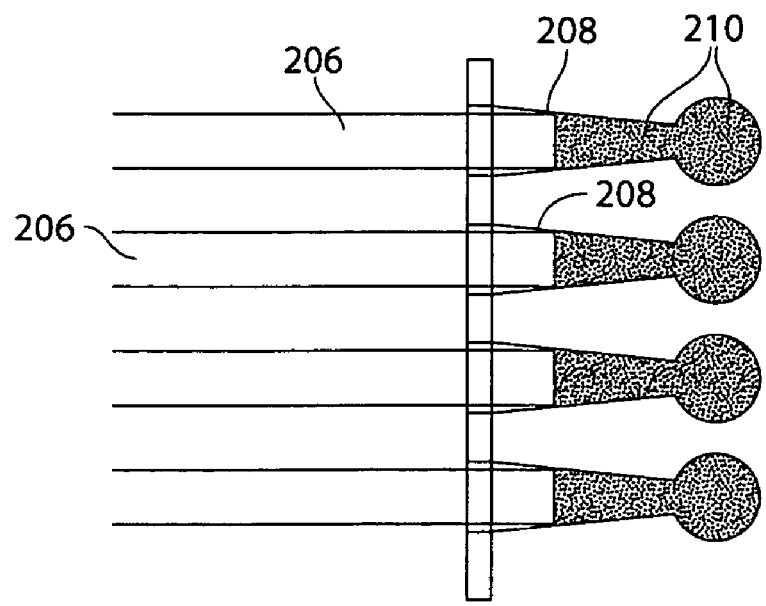
Figure 12C:
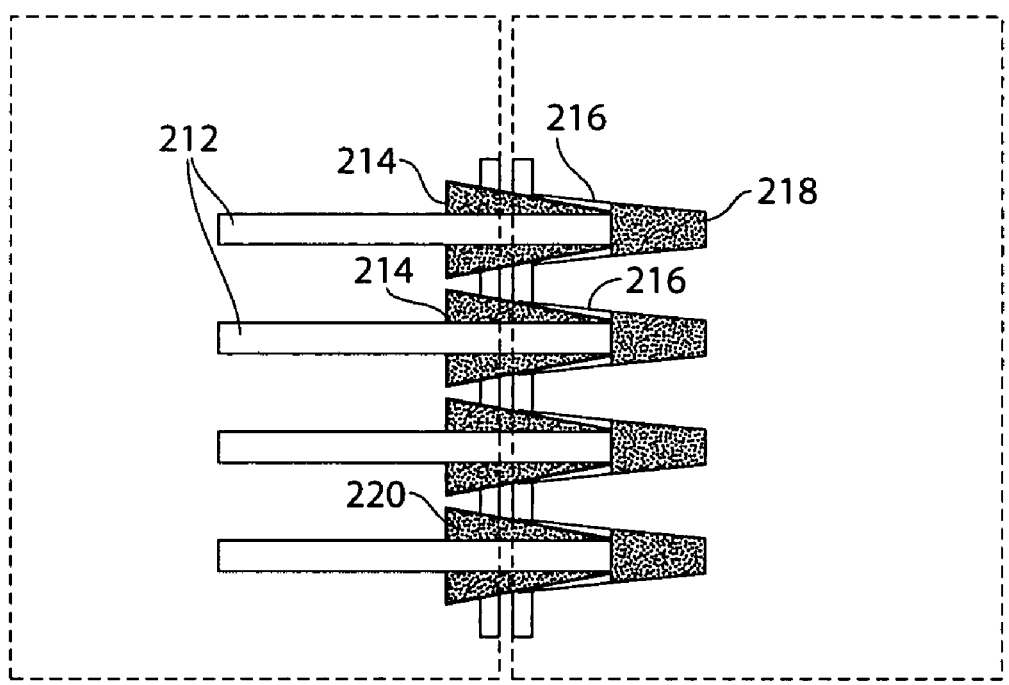

Referring to FIGS. 12A–12C, the present invention has application in sensing systems. Optical sensors are commonly formed by doping host matrices with calorimetric or fluorescent materials that are sensitive to environmental conditions. Common applications are blood gas sensing, biological oxygen demand, food safety, etc. By combining such indicators with microneedles, several advantages are attained. Small sensors can be formed within the needles by injecting the appropriately doped matrix materials 204, 210, 218, into the needles 202, 208. Small sensor elements result in fast response times. Next, these sensing elements are readily combined with excitation and detection devices using the coupling geometries described herein above. The sensors can be remotely excited and/or detected using optical fibers coupled as described herein. As such, sensor arrays are readily fabricated. Using the coaxial needle arrangement described previously, multiple sensing materials can be incorporated into one position. It should be noted that excitation can be focussed or reflected by the lens section for greater sensitivity. As shown in FIG. 12B, the exposed spherical region has greater surface area for faster and larger response to, for example, an analyte.

Additionally, using two needle arrays as shown in FIG. 12C, one with a sensing material 216 and one with fibers 214 as described for the laser/fiber connector herein, a detachable or disposable sensing element that is readily connected and disconnected is achieved. The detachable sensor array fits on the end of a multiple fiber excitation device that is coupled through a second needle array with a wider angle than the sensor needles. In addition, the sensor elements themselves are low cost and therefore economical. In addition, since the microneedles can be injected into the skin, an eye, food products, etc., the needles provide an excellent means to bring the sensing elements contained within into contact with the environment to be sensed.

Any of the optical configurations described herein may be combined with sensing materials to achieve new functionality. The sensing elements comprise a supporting matrix doped with various environmentally sensitive dyes. Matrix elements include, for example, sol gels, hydrogels, and other polymers with a high gas or liquid permeability. By using a hydrophobic matrix, efficient gas-liquid separation is achieved. There is a vast collection of dyes which can be incorporated, including, but not limited to, rhodamines, various bodipy dyes, ruthenium-based and other rare earth dyes, and metal intercalating dyes.

The sensor elements are fabricated by dispensing the polymers under pressure into a needle array in much the same way the epoxies are dispensed as described herein. After injection, the matrices either set up or are cured using thermal or photochemical processes.

While this invention has been particularly shown and described with references to preferred embodiments thereof, it will be understood by those skilled in the art that various changes in form and details may be made therein without departing from the scope of the invention encompassed by the appended claims.

What is claimed is:

1. An optical device comprising:
   a plurality of needles having channels;
   a plurality of fibers inserted in the plurality of needles;
   and a plurality of optical components aligned and connected with the plurality of fibers,
   wherein said channels for said needles are tapered, and wherein each of said needles has dimensions of about 125 micron exit hole at the narrower end, about 125 micron length, about 175–200 micron entrance hole at the wider end, and about 250 micron between centers.

2. The optical device of claim 1 wherein the needles are microneedles.

3. The optical device of claim 1 wherein the optical components are vertical cavity surface emitting lasers.

4. The optical device of claim 1 wherein the optical components are photodetectors.

5. The optical device of claim 1 further comprising a plurality of photodetectors.

6. The optical device of claim 1 further comprising a sensing element.

7. The optical device of claim 6, wherein said sensing element comprises a matrix doped with calorimetric and/or fluorescent materials that are sensitive to environmental conditions.

8. The optical device of claim 7, wherein said calorimetric materials comprise environmentally sensitive dyes selected from rhodamines, bodipy dyes, ruthenium-based dyes, earth dyes, or metal intercalating dyes.

9. The optical device of claim 7, wherein said matrix is selected from: sol gels, hydrogels, polymers with a high gas or liquid permeability, or a hydrophobic matrix.

10. The optical device of claim 6, wherein said sensing element is suitable for blood gas sensing, biological oxygen demand, or food safety.

11. The optical device of claim 6, wherein said sensing element is within or outside the tips of said needles.

12. The optical device of claim 1, wherein the narrowed end of said tapered channel is narrower than the diameter of said fibers.

13. The optical device of claim 1, wherein said needles are fabricated using photolithography and/or laser drilling.

14. The optical device of claim 1, wherein said needles have needle bore and needle placement accurate to about 1 micron.

15. The optical device of claim 1, wherein said fibers are fixed inside said needles.

16. The optical device of claim 15, wherein said fibers are fixed inside said needles with epoxy.

17. The optical device of claim 1, wherein said needles are made of metal.

18. The optical device of claim 1, further comprising a layer of transparent underfill between said plurality of needles with said plurality of fibers inserted therein, and said plurality of optical components.

19. The optical device of claim 1, wherein the void in said channels with said fibers inserted therein is filled with cured epoxy.

20. The optical device of claim 19, wherein a cured epoxy plug separates the narrower end of said needle or channel and the end of said fiber.

21. The optical device of claim 19, further comprising a cured epoxy lens outside the tip of said needle.

22. The optical device of claim 21, wherein said cured epoxy lens is spherical in shape.

* * * * *